Patented Jan. 23, 1934

1,944,541

UNITED STATES PATENT OFFICE 1,944,541

METHOD OF TREATING CREAM FOR INCREASING THE VISCOSITY THEREOF

Ture Viktor Bergman, Halsingborg, and Hilding Adolf Svedberg, Halmstad, Sweden

No Drawing. Application December 24, 1932, Serial No. 648,824, and in Sweden January 14, 1932

3 Claims. (Cl. 99—11)

From a commercial point of view it is desirable that cream for consumption purposes, especially cream having a relatively high fat content, such as used for making whipped cream, is highly viscous, i. e. thick and treacly, when delivered to the consumers, and therefore many attempts have been made to increase the viscosity of the cream through special treatment thereof without spoiling or changing the qualities of the cream in other respects. It has already been assumed that the viscosity of the cream is increased if the fat globules can be brought together so as to form relatively stabile groups or aggregates. Such an aggregation of the fat globules is considered to set in, for instance, after treatment of the cream according to the high pressure homogenizing process, due to the change in size of the fat globules obtained by this treatment in which the fat globules are broken up by the high pressure to which the cream is subjected. The high pressure homogenizing process, however, has not been found practical or satisfactory, and nor any other method hitherto proposed has been found satisfactory in practice, so far as is known.

According to our present invention it has been found that a method for increasing the viscosity of cream, which is entirely satisfactory and sufficiently simple to be easily practicable, consists in repeatedly deep cooling the cream and alternately heating the same to a temperature preferably exceeding ordinary room temperature, while avoiding temperatures sufficiently high for again fluidizing the fat solidified through the deep cooling. This relatively simple treatment of the cream apparently results in an agglomeration or grouping together of the fat globules, whereby the viscosity of the cream is materially increased, while the cream maintains its natural qualities in all other respects.

Thus, according to the invention, the cream is first cooled to a sufficiently low temperature and for a sufficiently long time for reducing the fat, or the greatest part thereof at least, to solid form. Generally the cream for this purpose must be cooled to a temperature of 5–6° C. for 2–3 hours. The natural solidity of the fat, however, may vary with the seasons and the feeding of the milk cows etc., and consequently the cooling required may also vary accordingly. After this deep cooling the cream is heated with care, so that the fat is not again fluidized, to a temperature dependent upon how much it is desired to increase the viscosity of the cream. Generally the greatest increase of the viscosity of the cream is obtained if the cream is heated to a temperature between 25 and 35° C. Agitation of the cream during the heating thereof improves the result of the treatment. After this heating of the cream it is again deep cooled. After some time, for instance after two or three hours, the cream will then be found to have a substantially increased viscosity, i. e. it is found to be thicker and more treacly than cream of the same kind which has not been subjected to the treatment hereinbefore described but has been deep cooled as usual or one time only. After the second deep cooling the cream may be subjected to a repeated heating treatment and then to a third deep cooling treatment, whereby a further increase of the viscosity may be obtained.

The term deep cooling is used to signify a cooling to a temperature generally below 10° C., i. e. a cooling that generally can be obtained only by the use of a cooling agent such as ice, salt solution or the like, as distinct from a cooling such as generally can be obtained by means of wellwater. Obviously the cream should not be cooled to such a low temperature at which freezing takes place. The lower the temperature is to which the cream is cooled, the shorter is the cooling time required at each cooling treatment. Even if a slight increase of the viscosity is obtainable by cooling the cream by means of well-water only (having a temperature of say 10–12° C.), this increase in most cases will be found too small for practical purposes, if not the cream is cooled for a very long time (which in most cases is impracticable) at each cooling treatment. The heating treatment alternating with the cooling treatments can be varied as regards the temperature and duration for the purpose of controlling the viscosity to be obtained. It has been found that in order to obtain a substantial increase of the viscosity a temperature of at least 20–22° C., should be attained in the heat treatment, and that generally a higher temperature should be used, so that in most cases it will be necessary to make use of a suitable heating agent, such as heated water or steam, for effecting the heating.

What we claim and desire to secure by Letters Patent is:—

1. The method of treating sweet cream, especially cream having a relatively high fat content, such as used for making whipped cream, for increasing the viscosity of the cream while leaving its other qualities substantially unchanged, consisting in repeatedly great cooling the cream and alternately heating the same to a temperature exceeding ordinary room temperature while avoiding temperatures sufficiently high for again fluidizing the fat solidified through said great cooling.

2. The method of treating sweet cream, especially cream having a relatively high fat content, such as used for making whipped cream, for increasing the viscosity of the cream while leaving its other qualities substantially unchanged, consisting in cooling the cream to a sufficiently low temperature and for a sufficiently long time for reducing at least the greatest part of the fat content of the cream to solid form, then heating the cream to a temperature of at least 20–22° C., while avoiding temperatures sufficiently high for again fluidizing the fat solidified through the said cooling, and then again cooling the cream to substantially the same temperature as maintaining during the first cooling for a sufficient time for obtaining the desired increase of the viscosity of the cream.

3. The method of treating sweet cream, especially cream having a relatively high fat content, such as used for making whipped cream, for increasing the viscosity of the cream while leaving its other qualities substantially unchanged, consisting in cooling the cream to a temperature of 5–6° C. for 2–3 hours, then heating the cream to a temperature of 25–35° C., and then again cooling the cream to substantially the same temperature as maintaining during the first cooling for some hours for obtaining the desired increase of the viscosity of the cream.

TURE VIKTOR BERGMAN.
HILDING ADOLF SVEDBERG.

DISCLAIMER 1,944,541.—*Ture Viktor Bergman*, Halsingborg, and *Hilding Adolf Svedberg*, Halmstad, Sweden. METHOD OF TREATING CREAM FOR INCREASING THE VISCOSITY THEREOF. Patent dated January 23, 1934. Disclaimer filed November 23, 1936, by the assignee, *The Borden Company*.

Hereby enters this disclaimer to claim 2 of said specification.
[*Official Gazette December 15, 1936.*]

izing the fat solidified through said great cooling.

2. The method of treating sweet cream, especially cream having a relatively high fat content, such as used for making whipped cream, for increasing the viscosity of the cream while leaving its other qualities substantially unchanged, consisting in cooling the cream to a sufficiently low temperature and for a sufficiently long time for reducing at least the greatest part of the fat content of the cream to solid form, then heating the cream to a temperature of at least 20-22° C., while avoiding temperatures sufficiently high for again fluidizing the fat solidified through the said cooling, and then again cooling the cream to substantially the same temperature as maintaining during the first cooling for a sufficient time for obtaining the desired increase of the viscosity of the cream.

3. The method of treating sweet cream, especially cream having a relatively high fat content, such as used for making whipped cream, for increasing the viscosity of the cream while leaving its other qualities substantially unchanged, consisting in cooling the cream to a temperature of 5-6° C. for 2-3 hours, then heating the cream to a temperature of 25-35° C., and then again cooling the cream to substantially the same temperature as maintaining during the first cooling for some hours for obtaining the desired increase of the viscosity of the cream.

TURE VIKTOR BERGMAN.
HILDING ADOLF SVEDBERG.

DISCLAIMER 1,944,541.—*Ture Viktor Bergman*, Halsingborg, and *Hilding Adolf Svedberg*, Halmstad, Sweden. METHOD OF TREATING CREAM FOR INCREASING THE VISCOSITY THEREOF. Patent dated January 23, 1934. Disclaimer filed November 23, 1936, by the assignee, *The Borden Company*.

Hereby enters this disclaimer to claim 2 of said specification.
[*Official Gazette December 15, 1936.*]